United States Patent [19]

Simcoe et al.

[11] Patent Number: 5,796,966

[45] Date of Patent: Aug. 18, 1998

[54] METHOD AND APPARATUS FOR DYNAMICALLY CONTROLLING DATA ROUTES THROUGH A NETWORK

[75] Inventors: Robert Simcoe, Westborough; Robert E. Thomas, Hudson; George Varghese, Bradford, all of Mass.

[73] Assignee: Digital Equipment Corporation, Maynard, Mass.

[21] Appl. No.: 850,975

[22] Filed: May 5, 1997

Related U.S. Application Data

[63] Continuation of Ser. No. 24,580, Mar. 1, 1993, abandoned.

[51] Int. Cl.[6] .................................................. G06F 13/00
[52] U.S. Cl. ..................... 395/311; 370/360; 395/200.68
[58] Field of Search ................................. 395/311, 312,
395/200.68, 200.62, 736; 370/60, 94.1,
360

[56] References Cited

U.S. PATENT DOCUMENTS

| | | | |
|---|---|---|---|
| 3,732,548 | 5/1973 | Howells et al. | 395/311 |
| 4,608,685 | 8/1986 | Jain et al. | 370/94 |
| 4,827,411 | 5/1989 | Arrowood et al. | 364/300 |
| 4,862,451 | 8/1989 | Closs et al. | 370/60 |
| 4,914,648 | 4/1990 | Acampora et al. | 370/3 |
| 4,962,497 | 10/1990 | Ferenc et al. | 370/60.1 |
| 4,965,788 | 10/1990 | Newman | 370/60 |
| 4,985,889 | 1/1991 | Frankish et al. | 370/94.1 |
| 5,005,122 | 4/1991 | Griffin et al. | 364/200 |
| 5,050,069 | 9/1991 | Hillis et al. | 395/500 |
| 5,081,623 | 1/1992 | Ainslow | 370/85.4 |
| 5,107,493 | 4/1992 | Eng et al. | 370/94.1 |
| 5,113,496 | 5/1992 | McCalley et al. | 395/200 |
| 5,210,743 | 5/1993 | Eilenberger et al. | 370/60 |
| 5,249,178 | 9/1993 | Kurano et al. | 370/60 |
| 5,265,257 | 11/1993 | Simcoe et al. | 395/725 |
| 5,274,782 | 12/1993 | Chalasani et al. | 395/311 |
| 5,295,133 | 3/1994 | Jurkevich | 370/60 |
| 5,309,433 | 5/1994 | Cidon et al. | 370/60 |
| 5,325,356 | 6/1994 | Lyles | 370/60 |
| 5,355,405 | 10/1994 | Bernstein | 379/246 |
| 5,396,491 | 3/1995 | Newman | 370/60 |
| 5,404,352 | 4/1995 | Pauwels et al. | 370/60 |
| 5,404,461 | 4/1995 | Olnowich et al. | 395/311 |

OTHER PUBLICATIONS

Dictionary of Computers, Information Processing & Telecommunications 1987, pp. 95, 96 & 947.

*Primary Examiner*—Jack B. Harvey
*Assistant Examiner*—Paul R. Myers
*Attorney, Agent, or Firm*—Cesari & McKenna

[57] ABSTRACT

A mechanism for operating a configurable switch to dynamically (i) route each of the data packets in an ordered string from a particular switch input port through a selected member output port of a hunt group; and (ii) route data packets which need not be transmitted in order from the input ports to available member output ports of the hunt group, as the members become available. A controller assigns each input port a service number, and directs member output ports to handle requests for ordered data packet transmissions from input ports with particular service numbers, such that the ordered transfers from an input port are handled by a single member of each group. The input port broadcasts, through the switch, a request to send ordered data packets through a particular hunt group and includes its service number in the request. The group member assigned to handle ordered transfers from the input port responds by identifying itself. Thereafter, the input port sends its ordered data packets to the identified member. Unordered data packets are queued and routed dynamically through the members of the group, as the members become available. In a local area network, data is sent from a source station to file servers using server group identifiers for multiple-route transfers or individual server identifiers for single-route transfers.

8 Claims, 4 Drawing Sheets

A SWITCH INPUT PORT WITH SINGLE-ROUTE
DATA TO SEND FORMULATES A SINGLE
ROUTE DATA TRANSFER REQUEST WHICH — 40
INCLUDES THE INPUT PORT'S SERVICE NUMBER
AND BROADCASTS THE REQUEST
TO THE MEMBER OUTPUT PORTS OF THE
APPROPRIATE HUNT GROUP
↓
EACH OUTPUT PORT MEMBER DETERMINES IF — 41
IT SERVICES INPUT PORTS WITH THE INCLUDED
SERVICE NUMBER
↓
THE MEMBER ASSIGNED THE SERVICE
NUMBER RESPONDS TO THE REQUEST BY — 42
SENDING BACK ITS MEMBER IDENTIFIER AND A
SINGLE-ROUTE QUEUE POSITION NUMBER AND
INCREMENTING ITS SINGLE ROUTE QUEUE LENGTH BY ONE
↓
THE INPUT PORT RETAINS THE MEMBER IDENTIFIER
AND THE SINGLE-ROUTE QUEUE POSITION NUMBER — 43
↓
A MEMBER AVAILABLE TO HANDLE A SINGLE-ROUTE
DATA TRANSFER BROADCASTS A MESSAGE TO THE INPUT
PORTS INDICATING ITS AVAILABILITY — 44
↓
THE INPUTS PORTS QUEUED TO SEND SINGLE-ROUTE
DATA TO THIS PARTICULAR MEMBER DECREMENT — 45
THEIR SINGLE-ROUTE QUEUE POSITION NUMBERS
↓
THE INPUT PORT WHICH IS FIRST IN THE SINGLE-ROUTE
QUEUE SENDS ITS NEXT DATA PACKET TO THE MEMBER — 46
↓
THE MEMBER DECREMENTS ITS SINGLE-ROUTE
QUEUE LENGTH NUMBER BY ONE — 47

*Figure 4*

METHOD AND APPARATUS FOR DYNAMICALLY CONTROLLING DATA ROUTES THROUGH A NETWORK

This application is a continuation of application Ser. No. 08/024,580, filed Mar. 1, 1993 now abandoned.

FIELD OF THE INVENTION

This invention relates generally to mechanisms controlling data routes through a network, and more particularly, mechanisms for controlling the operations of configurable switches for communications networks.

BACKGROUND

A communications network includes a number of stations which communicate with each other, that is, exchange messages and data packets, over various paths, or routes, through the network. The network to which the invention is directed includes switches which direct the data along various routes, between source stations and destination stations. The network typically includes several different routes between any two source and destination stations. To reduce network congestion, the switches direct the data along a particular route which is then able to handle the data.

Many switches include multiple output port "hunt groups," which each include two or more "member" output ports which relay data packets directed to a particular destination station. Each member output port receives data packets transmitted through the switch and relays the data packets to the destination station over an associated route. For example, each member output port of a particular hunt group may transfer data between a first switch which receives data packets from several source stations and a second switch which directs the data packets to several destination stations. The first switch directs the data packets from its input ports to member output ports, as the member output ports become available. Each member output port which receives a data packet then relays the data packet to the second switch over an associated route. The data is thus dynamically routed along various routes between the two switches.

In a known prior switch mechanism a station begins a data transfer operation by sending a data packet to an associated switch input port. The switch input port then sends a data transfer request through the switch to the member output ports of a hunt group, that is, "broadcasts" the request to the hunt group. A designated member of the hunt group responds by sending back to the switch input port a group queue position number, which basically queues this data packet transfer behind previously requested transfers.

When any member of the hunt group becomes available, it broadcasts to each of the switch input ports a message in which it identifies itself individually and as a member of the hunt group. The is switch input port which is first in the queue waiting to send data to the hunt group responds to the message by transferring its data packet to the available hunt group member, while the others in the queue decrement their associated queue position numbers.

An example of such a configurable switch is the switch discussed in a co-pending patent application Ser. No. 07/542,856 now U.S. Pat. No. 5,265,257 assigned to the same assignee as the current application, namely, Digital Equipment Corporation. The switch is readily configurable to broadcast messages from between switch input ports and member output ports, and route data packets from individual input ports to available member output ports.

While this dynamic routing works well for many types of data exchanges, it does not necessarily work well for exchanges which consist of a stream of data packets which must reach a destination in a particular order. When these packets are sent to a hunt group, they are routed through the members as the members become available, and thus, the packets are generally sent along different routes to the destination. Accordingly, the packets may arrive at the destination out of order, due to differing delays in the various routes.

SUMMARY OF THE INVENTION

The invention is a mechanism for operating a configurable switch so that the switch is capable of dynamically selecting between two modes of operations: (i) routing data packets which need not be received in a particular order, herein referred to as "multiple-route data," dynamically through the various members of the hunt groups and (ii) routing each of the data packets in an ordered string of packets, herein referred to as "single-route data," through a selected member of each of the hunt groups to preserve the order of arrival of the packets at a destination.

For single-route data communications, each switch input port is assigned to a particular member output port of each of the hunt groups. To do this, a controller included in the switch assigns each switch input port a service number and assigns corresponding service numbers to the member output ports of each of the hunt groups, such that each number is assigned to exactly one member of each of the groups. This ensures that each client is serviced, throughout a single-route transfer, by the same member, and thus, that the data packets travel over a single associated route.

A switch input port with the service number k may be, for example, serviced by the $1^{st}$ member output port in hunt group number 1 and by the $k^{th}$ member output port in hunt group number 100. While each switch input port must be serviced by only one member output port per hunt group, each member output port can service any number of different switch input ports. Thus various input ports may each be assigned the same service number and a member output port may be assigned more than one service number. The order of arrival of the single-route data packets is necessarily preserved by having each input port serviced by a single member output port of each of the hunt groups.

Preferably, each member output port retains its service number assignments, and each switch input port retains its single service number. Only the controller needs to keep track of all of the assignments. Accordingly, each port devotes a minimal amount of storage space to facilitate the single-route transfers.

When a station has multiple-route data to transfer through a switch, the station sends a data packet to an associated switch input port. The switch input port then broadcasts a multiple-route data transfer request to the particular hunt group. In response, a designated member of the hunt group returns a multiple-route queue position number to the requesting input port, along with a hunt group identifier. Each time a member of the group becomes available to process such a data transfer, that member broadcasts to the switch input ports a message identifying itself as an available member of the hunt group. The input port which is first in the multiple-route queue to send data to the hunt group sends a data packet to the member identified in the message. Every input port waiting to send multiple-route data to this group, as well as the designated member of the hunt group which maintains the group queue, update their respective multiple-route queue position numbers by decrementing them by one.

When a switch input port receives a data packet which requires a single-route data transfer, the input port produces a request for such a transfer and includes in the request its assigned service number. The input port then broadcasts the request to the members of the appropriate hunt group. The members examine the service number in the request, and the single member which is assigned to service input ports with this service number responds to the request. This member sends back to the port a member identifier and a single-route queue position number, which indicates the position of this data transfer in that member's single-route queue. Each time the identified member is available to send a single-route communication the member broadcasts to the input ports a message identifying itself and indicating its availability for the transfer. The input port which is first in this single-route queue responds to the message by sending the next data packet in its ordered string to the member. Every input port waiting to send single-route data to this member, as well as the member itself, update their respective single-route queue position numbers by decrementing them by one.

The assignment of input ports to the member output ports of the hunt groups can be changed relatively easily, by changing the numbers assigned to the various group members. The controller can, for example, re-assign the service number of an input port which requires frequent single-route transfers to a member output port which is not usually busy. This member thereafter responds to the input port's single-route data transfer requests and transfers the input port's data packets. Similarly, if a group member becomes non-functional the controller can re-assign the service numbers handled by that member to other members of the group, without having to notify the individual input ports serviced by the non-functional group member. The input ports do not alter their data transfer operations, they continue to broadcast single-route data transfer requests through the switch and send their data packets to an identified member output port. Thus the input port's packets arrive in order at the desired destination, they simply arrive by an alternate route.

In a preferred embodiment, the member output ports each store their service number assignments in a table which is addressed using the service numbers. The respective tables include a flag or a special value in each of the locations corresponding to the service numbers assigned to the associated member. A member then uses the service numbers in the single-route data transfer requests to enter the table and quickly determine if it services a particular input port, so that the member can, as necessary, respond to the transfer request by sending its single-route queue position number back to the input port.

BRIEF DESCRIPTION OF THE DRAWINGS

The above and further advantages of the invention may be better understood by referring to the following description in conjunction with the accompanying drawings, in which:

FIG. 4 is a flow chart of the operations of the switch input ports and output ports of FIG. 3 in performing a single-route data transfer.

DESCRIPTION OF ILLUSTRATIVE EMBODIMENTS

The term "source station" used herein refers to any entity which transfers data to a configurable switch. A source station can thus be a node, a member output port of a hunt group, and so forth. The term "destination station" used herein refers to any entity which receives data from a configurable switch. The destination station can thus be a node, a switch input port, and so forth.

Figure 1:
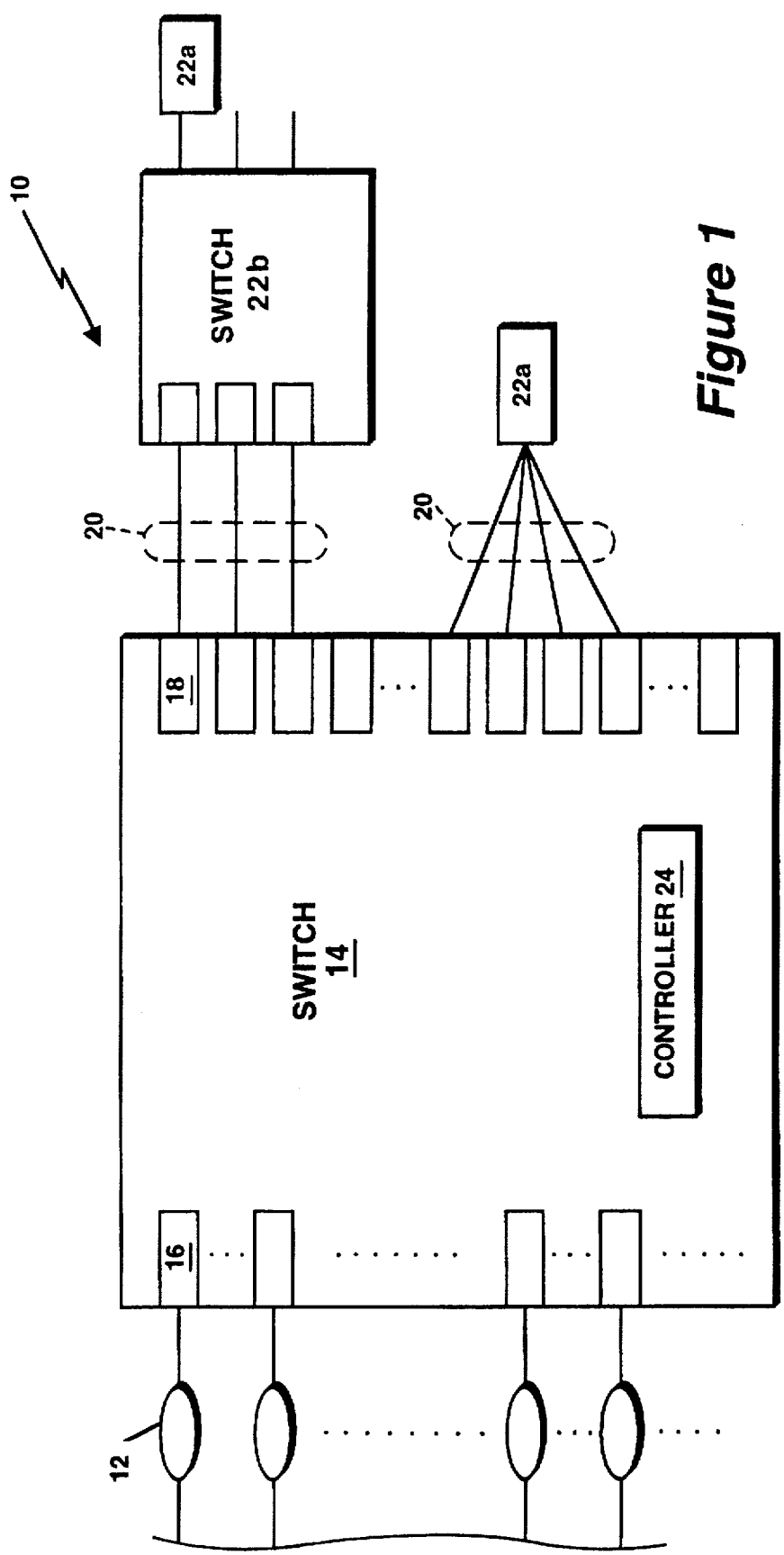
FIG. 1 is a functional block diagram of a network which includes a configurable switch, source stations connected to the input ports of the switch and destination stations which are connected to the output ports.

FIG. 1 depicts a network 10 in which source stations 12 transfer data through a configurable switch 14 to destination stations referred to generally by reference numeral 22. One such destination station is a node 22a while another is a switch 22b. The source-stations 12 are connected to transfer data to switch input ports 16. The input ports 16, in turn, transfer the data to switch output ports 18, which are members of hunt groups 20. The output ports 18 then transfer the data to the destination stations, such as switch 22b which may further transfer the data through the network or provide the data to a network node, such as station 22c.

Data is transferred over the network in the form of packets. Each data packet is either part of a single-route data transfer, which includes a string of data packets which must arrive at a destination in a particular order, or part of a multiple-route data transfer, which includes one or more data packets which may arrive at a destination in any order. Each data packet includes data which indicates if the packet is part of a single-route or a multiple-route data transfer.

Figure 2:
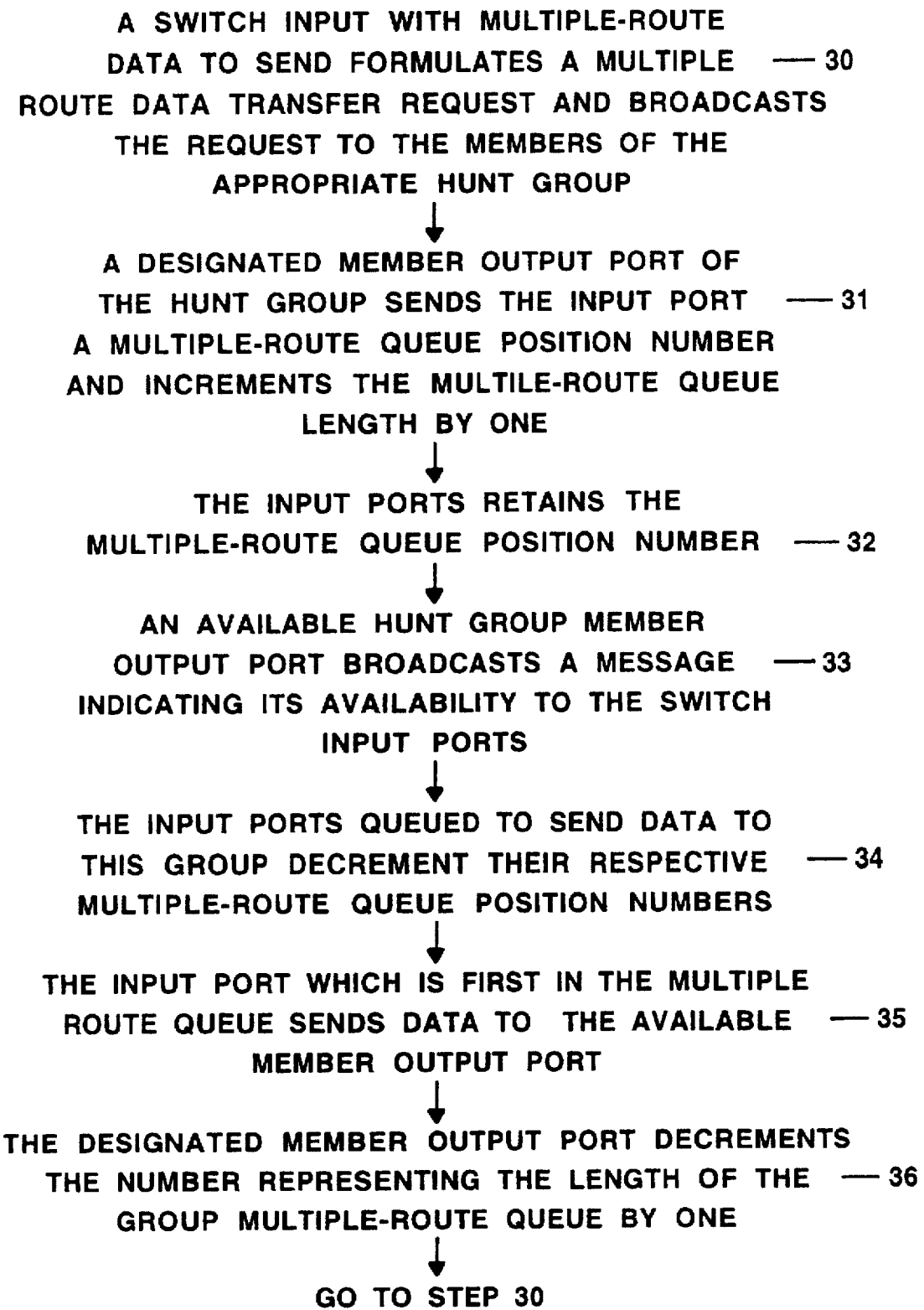
FIG. 2 is a flow chart of the operations of the switch input ports and output ports of FIG. 1 in performing a multiple-route data transfer.

Referring now to FIGS. 1 and 2, when a source station sends to an input port 16 data which is part of a multiple-route data transfer, the input port broadcasts a multiple-route data transfer request to the member output ports 18 of the hunt group 20 which is associated with the destination of the transfer (step 30). A member of the hunt group which is designated to maintain a number representing the length of the group multiple-route queue responds to the multiple-route transfer request by returning to the requesting input port a group identifier and a multiple-route queue position number, which indicates the number of preceding multiple-route data transfer requests to be handled by the group (step 31). The input port waiting to transfer data to the group retains this number and waits for its turn to transfer data (step 32). The designated member increases the number representing the length of the group's multiple-route queue by one, so that it can provide—to the next client sending a data transfer request—an accurate multiple-route queue position.

When any member in the hunt group 18 is next available for a multiple-route data transfer, the member broadcasts through the switch 14 to the input ports 16 a message that identifies the output port as an available member of the hunt group (step 33). The input port which is first in the queue to send data to this group responds to the message by sending a data packet to the available member and all input ports in the multiple-route queue update their respective queue position numbers by decrementing them by one (steps 34–35). The designated member also decrements its multiple-route queue number, so that it can provide an updated multiple-route queue position number in response to the next multiple-route data transfer request (step 36).

As discussed above, data packets sent as multiple-route data may arrive at a destination out of the order in which they were sent, without adverse consequences. Thus the packets can be transferred to the destination by the various members along different routes. When a string of data packets must arrive in a particular order, however, the packets must instead be directed over a single-route so that they necessarily arrive in the order in which they are sent.

Figure 3:
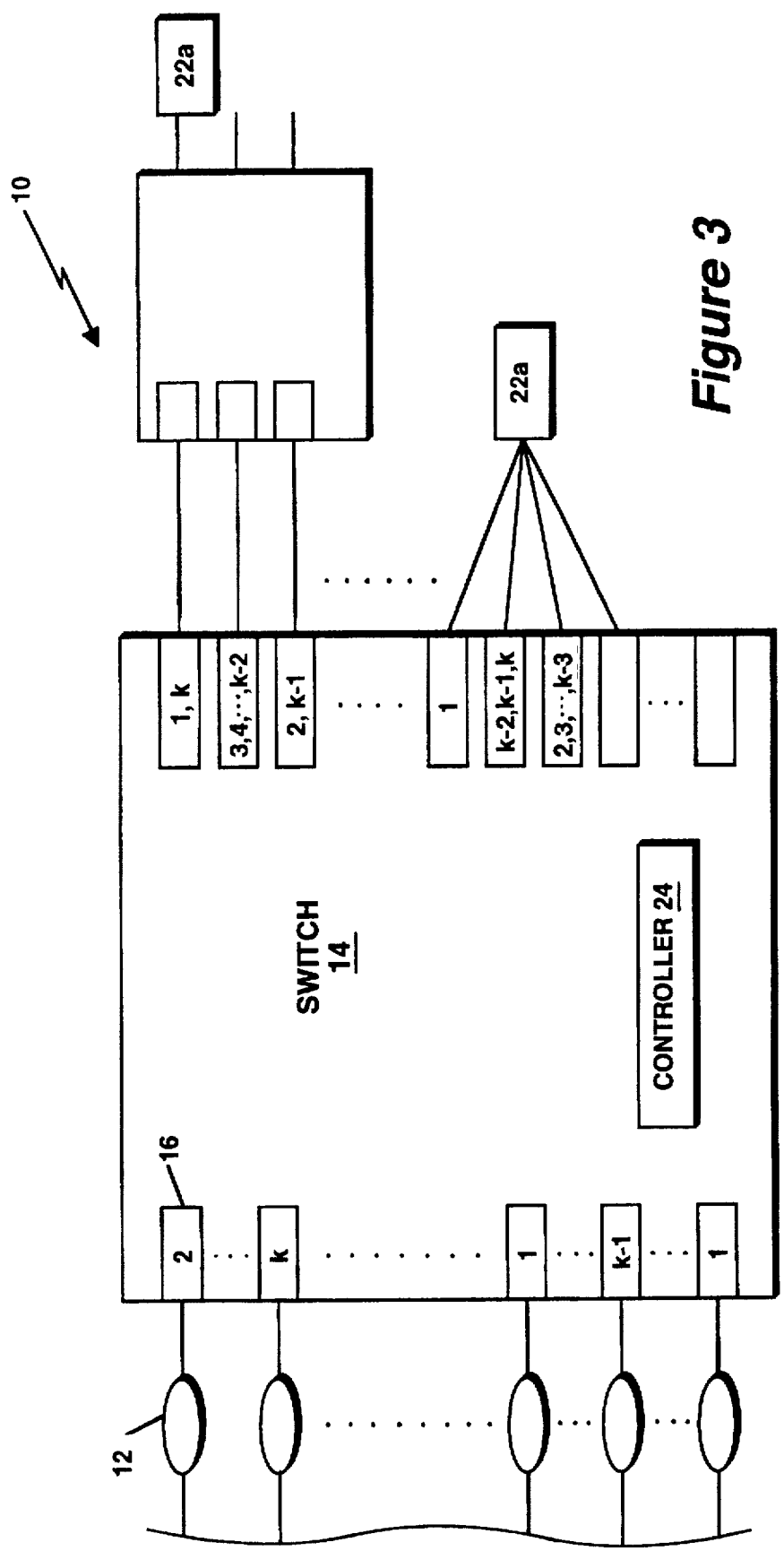
FIG. 3 is a functional block diagram of the network of FIG. 1, depicting single-route communications.

To facilitate a single-route data transfer, each input port 16 is assigned a service number from 0 to k by a controller 24 which is included in the switch, as depicted in FIG. 3. The controller 24 may use any predetermined criteria to assign the service numbers to the input ports, such as assigning a different service number to each of the busy ports. Each input port stores its service number and, as discussed below, includes its service number in single-route data transfer requests.

The system controller 24 also assigns one or more service numbers to each hunt group member output port which is to handle single route transfers. These members then handle the single-route data transfers from the input ports with the same service numbers. The controller assigns the numbers to the members such that exactly one member in each group handles single-route data transfers from a given input port. The first member output port 18 in a hunt group 20 may, for example, be assigned service number k, so that it handles all single-route transfer requests directed to the hunt group from every input port which is assigned that service number. The other members are assigned one or more of the remaining service numbers. Each member output port stores its service numbers so that it can refer to them when it receives a single-route data transfer request to determine, as discussed below, if it should respond to the request.

Referring now to FIGS. 3 and 4, a source station 12 initiates a single-route transfer by sending data to an associated input port 16. The input port 16 formulates a single-route data transfer request which includes the input port's service number and broadcasts this request to all member output ports 18 of the hunt group 20 which directs data to the desired destination (step 40). Each member of this group determines if it is assigned to handle data transfers from an input port with the included service number by, for example, comparing the service number with its stored service numbers (step 41). The one member output 18 which is assigned this service number sends back to the input port a member identifier and a single-route queue position number, which indicates how many single-route transfers directed to this member precede this particular transfer (step 42). The input port then retains the identifier and the single-route queue position number (step 43). The member increments the number representing the length of its single-route queue by one.

When a member 18 is available to handle a single-route data transfer, the member broadcasts to the input ports 16 a message which indicates its availability for the single-route transfer (step 44). The input port which is first in the queue to send single-route data to this particular member responds to the message by sending its next ordered data packet to the member, and all input ports waiting in the queue decrement their respective single-route queue position numbers by one to update their positions (steps 45–46). The member also decrements the number which represents the length of the member's single-route queue, so that it can send an accurate position number in response to the next single-route data transfer request directed to it (step 47).

The controller 24 controls the frequency with which the member output ports perform single-route transfers. For example, it may have certain members alternate between their multiple-route and single-route operations. Alternatively, it may have certain members, for example, those assigned to busy input ports, perform single-route transfers more frequently.

In a preferred embodiment of the system, each member stores is information relating to its assigned service numbers in a k element table which is addressable using the service numbers. A table location corresponding to a service number assigned to the member contains a special marker. Accordingly, a member determines if it is assigned a particular service number by using that number to address the table. Each time a member receives a single-route data transfer request, it quickly performs a table look-up operation to determine if it should respond to the request. This look-up operation eliminates the need to compare the service number in the request with each of the service numbers stored in the member.

The controller assigns service numbers 1 to k to the input ports, where k need be only the maximum number of members in a group to which single-route transfers are to be directed. For example, a switch may have 1000 input ports, 100 hunt groups with between 10 and 20 members and direct single route transfers to at most 8 member output ports in any hunt group. The table in which the assignments are stored is thus an 8 element table, which can be implemented in an 8-bit RAM or register.

Each member output port stores information relating to the service numbers which it is assigned to service, and each input port stores its own service number. Only the controller stores information relating to individual input port and member assignments. This storage scheme minimizes the amount of information stored in each of the ports, particularly the input ports which may communicate with hundreds of hunt groups. Further, it allows assignment information to be communicated between input and output ports by sending a single service number. This minimizes the number of switch bus lines which must be used for the assignment information.

The storage scheme also facilitates changes in input port-member associations easily and quickly. The controller simply revises the assignment information stored in the tables of the affected member output ports, instead of contacting each of the affected input ports. The controller can thus switch one or more input ports from one member to another by adding the clients' service numbers to one member's table and deleting the service numbers from the table of the member to which they were previously assigned.

The current system handles efficiently both multiple-route and single-route data transfers, with a minimal amount of extra storage space and a minimal amount of extra information transfer. Each input port stores only its service number and each member stores only a k element table which indicates the service numbers assigned to the member. Members can quickly determine if they are assigned a particular service number by entering the table using the service number sent to them by an input port as part of a single-route data transfer request.

The system does not require dedicated single-route and multiple-route input and output ports. Further, it does not require that a port handle all of its single-route transfers prior to engaging in multiple-route transfers. The system can thus dynamically select the mode then required for efficient transfer of the data.

The scheme for dynamically controlling single-route and multiple-route transfers can also be used in a local area network (LAN) to route data between source stations, for example, personal workstations, and file servers. As long as the LAN has the capability to broadcast messages, data can be routed over the LAN either to any server in a particular group or to a designated server in the group using the multiple-route and single-route assignment operations discussed above. The source station includes in its data transfer either a server group identifier or an identifier for a particular server.

Stations and servers on a LAN do not ordinarily exchange information prior to a data transfer. To avoid making such exchanges before each single-route transfer, a station may store in a fast access memory, such as a cache, information identifying the last few servers it dealt with in single-route data transfers. If the source station has data that is going through one of the same server hunt groups, it sends the data directly to the previously identified server, following the usual data transfer protocol. Otherwise, the source station sends a separate communication to a server group, before it makes a data transfer, to obtain the identification of the server assigned to handle the source station's single route transfers. Since a source station often sends single-route data to only a small number of servers, the source station saves time and network bandwidth by storing the source group member information.

To avoid problems which may arise if the members' service assignments change, a time limit may be placed on the member identification information stored in the cache. Once this information is stored beyond the time limit, it can no longer be used and the client must again communicate with the group to determine the identity of the member assigned to service its single-route data transfer requests.

The foregoing description has been limited to specific embodiments of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A method of operating a configurable switch to send data between source stations connected to switch input ports and destination stations that receive data packets from switch output ports, said configurable switch to dynamically select between routing modes, where said switch output ports are configured as hunt groups, the method including the steps of:

A. assigning a service number to each switch input port;
   B. assigning one or more service numbers to each switch output port which is a member of a hunt group and which handles the transfer of single-route data including a string of data packets which must arrive at a particular destination station in a particular order;
   C. dynamically determining whether a data transfer is a single-route data transfer or a multiple-route data transfer;
   D. if data is to be transferred as single-route data
      i. broadcasting to the members of a hunt group associated with the particular destination station a data transfer request for a single-route data transfer which includes the service number assigned to the requesting input port;
      ii. sending, from the member which is assigned the service number included in the data transfer request, a member identifier and a single-route queue position number to the requesting input port;
      iii. broadcasting to the input ports a message from the assigned member that the member is available to perform a single-route data transfer;
      iv. responding to the message by sending to the assigned member data from the input port which is in the first position in the single-route queue; or
   E. if data is to be transferred as a multiple-route data transfer including one or more data packets which may arrive at a particular destination station in any order i. broadcasting to the members of a hunt group associated with the particular destination station a data transfer request from an input port;
   ii. returning from a designated member to the requesting input port a multiple-route queue position number;
   iii. broadcasting from a next available member of the hunt group to the input ports, a message that the member is available to perform a multiple-route data transfer;
   iv. responding to the message by sending, to the member station identified in the message, data from the input port which is in the first position in the multiple route queue.

2. The method of claim 1 further including the steps of:
   a. for each message from a member indicating availability to handle a single-route data transfer, decrementing the single-route queue position numbers held by each of the input ports which are serviced by the member; and
   b. for each message from a member identified as available to handle a multiple-route data transfer, decrementing the multiple-route queue position numbers held by each of the input ports which are queued to send data to the hunt group.

3. The method of claim 1, further including the steps of:
   a. storing in each of the members, in a table addressed using the service numbers, the service numbers assigned to the member; and
   b. each member, after receiving a single-route data transfer request, using the service number included therein to enter the table to determine if the member should respond to the request.

4. The method of claim 1 further including the steps of:
   a. if the request is for a single-route data transfer, incrementing the single-route queue position number indicating the length of the queue of the member assigned to service this request, and
   b. decrementing the single-route queue position number when the member handles a single-route data transfer, and
   c. if the request is for a multiple-route data transfer, incrementing the number indicating the length of the group queue, and
   d. decrementing the group multiple-route position number when any member of the group handles a multiple-route data transfer.

5. A method of operating a configurable switch to send data between source stations which transfer data packets to switch input ports and destination stations that receive data from switch output ports, said configurable switch to dynamically select between routing modes, said output ports configured as hunt groups, the method including the steps of:
   A. assigning a service number to each switch input port;
   B. assigning one or more service numbers to each member of a hunt group;
   C. dynamically determining whether a data transfer is a single-route transfer or a multiple-route transfer;
   D. if data is to be transferred as single-route data including a string of data packets which must arrive at a particular destination station in a particular order
      i. broadcasting a request from an input port to a hunt group associated with the particular destination station requesting the identity of the member which is assigned to a particular service number; and
      ii. sending data from the input port to the identified member;

E. if the data is to be transferred as multiple-route data including one or more data packets which may arrive at a particular destination station in any order
  i sending data to a hunt group associated with the particular destination station;
  ii. sending the data to the member which is then available.

6. A system for sending data over a network, the system including:
  A. a configurable switch;
  B. a plurality of source stations for transmitting data through the switch, the source stations transferring the data to switch input ports;
  C. a plurality of destination stations for receiving data transmitted through the switch, the destination station receiving data from switch output ports;
  D. a controller for
    i assigning a service number to each switch input port;
    ii. assigning one or more service numbers to each switch output port which is a member of a hunt group and which handles single-route data transfers including transfer of a string of data packets which must arrive at a particular destination station in a particular order, such that each service number is assigned to one such member of each group;
  E. the switch determining whether a data transfer is a single-route transfer or a multiple-route transfer and broadcasting data transfer messages from the input ports to the member output ports of a group, and
    i if the requested data transfer is a single-route transfer, sending to the requesting input port from the member output port assigned the same service number as the requesting input port, a single-route queue position number and a member output port identifier and thereafter when the request is in the first position in the queue sending data from the requesting input port to the assigned member output port;
    ii. if the requested data transfer is a multiple-route transfer including transfer of one or more data packets which may arrive at a particular destination station in any order, sending from a designated member output port to the requesting input port a multiple-route queue number and when the requesting input port is in the first position in the queue sending data from the requesting input port to the member output port then available to handle the transfer.

the switch dynamically selecting between single-route routing and multiple-route routing and dynamically configuring the switch input ports and output ports according to the selected data transfer mode.

7. A system for sending data over a network, the system including:
  A. a plurality of source stations for transmitting data;
  B. a plurality of destination stations for receiving data from the source stations;
  C. a controller for
    assigning a service number to each source station;
    ii. assigning one or more service numbers to each destination station which is a member of a hunt group, such that each service number is assigned to one member of each hunt group;
    iii. dynamically determining whether a data transfer is a single-route transfer or a multiple-route transfer and dynamically configuring switch input ports and output ports according to a selected data transfer mode;
  D. a source station broadcasting data to the destination stations which are members of a hunt group, if the data is multiple route data including one or more data packets which may arrive at a particular destination station in any order; and
  E. the source station sending single route data including a string of data packets which must arrive at a particular destination station in a particular order to the particular destination station in the hunt group which is assigned to service source stations assigned the same service number as this source station.

8. The system for sending data of claim 7, wherein the source station sends a request to a hunt group of destination stations, the source station thereby seeking from the group the identity of the destination station responsive to the service number assigned to the source station.

* * * * *